United States Patent
Katayama

(10) Patent No.: US 10,237,443 B2
(45) Date of Patent: Mar. 19, 2019

(54) IMAGE READING APPARATUS AND IMAGE FORMING APPARATUS

(71) Applicant: CANON KABUSHIKI KAISHA, Tokyo (JP)

(72) Inventor: Takafumi Katayama, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/874,572

(22) Filed: Jan. 18, 2018

(65) Prior Publication Data
US 2018/0220034 A1   Aug. 2, 2018

(30) Foreign Application Priority Data

Jan. 30, 2017 (JP) .................................. 2017-014634

(51) Int. Cl.
*H04N 1/32* (2006.01)
*H04N 1/00* (2006.01)
*G03G 21/16* (2006.01)

(52) U.S. Cl.
CPC ..... *H04N 1/32646* (2013.01); *H04N 1/00519* (2013.01); *H04N 1/00602* (2013.01); *H04N 1/00798* (2013.01); *G03G 21/1619* (2013.01); *H04N 2201/0081* (2013.01)

(58) Field of Classification Search
CPC .................................................. H04N 1/00925
See application file for complete search history.

(56) References Cited

U.S. PATENT DOCUMENTS 9,764,916 B2 * 9/2017 Akimatsu ............ B65H 3/0684
2014/0293377 A1 * 10/2014 Minoshima .............. H04N 1/12
358/498

FOREIGN PATENT DOCUMENTS

JP    2012-151570    8/2012

* cited by examiner

*Primary Examiner* — King Poon
*Assistant Examiner* — Michael Burleson
(74) *Attorney, Agent, or Firm* — Venable LLP

(57) ABSTRACT

An image reading apparatus includes a reading unit including a reading sensor to read image information from a sheet through a transparent portion. The reading unit is movable with respect to a frame of the apparatus and is urged by an urging member toward a facing member facing the transparent portion. A fixed guide fixed to the frame is disposed in adjacent to the reading unit in the sheet conveyance direction. A plurality of protruded portions provided on either one of the reading unit and the fixed guide, and a plurality of recessed portions provided on the other of the reading unit and the fixed guide and formed so as to engage with the plurality of the protruded portions. The reading unit is movable with the plurality of the protruded portions loosely fit with the plurality of the recessed portions.

11 Claims, 7 Drawing Sheets

IMAGE READING APPARATUS AND IMAGE FORMING APPARATUS

BACKGROUND OF THE INVENTION

Field of the Invention

This disclosure relates to an image reading apparatus and an image forming apparatus including the same.

Description of the Related Art

Image reading apparatuses capable of reading image information from a document while automatically feeding and conveying one by one the document stacked on a document tray or the like are widely used. Such an image reading apparatus is usually provided with a transparent member and a facing member facing each other for defining a document conveyance path, and an image reader for reading image information through the transparent member by scanning the document passing through the document conveyance path.

Japanese Unexamined Patent Application Publication No. 2012-151570 discloses an image reading apparatus including a reading unit to read image information from a document conveyed by a document conveying device via a contact glass. The image reading apparatus has a pressing frame facing the contact glass and the pressing frame is urged toward the contact glass by a spring so that floating of the document away from the contact glass is suppressed.

Meanwhile, as a method of stabilizing a distance between a sheet serving as a document and the image reader, a retaining member for retaining the image reader may be arranged to be movable and to be urged toward the facing member or the facing member may be arranged to be movable and to be urged toward the transparent member. However, when such a configuration is adopted, there is a concern that the document is caught or sheet jam occurs at an unevenness or a gap, which may be formed at a boundary between, among those members facing the sheet conveyance path, a movable member movable with respect to the frame of the image reading apparatus and a fixed member fixed to the frame.

SUMMARY OF THE INVENTION

The present disclosure provides an image reading apparatus capable of reducing sheet jam while stabilizing a distance between an image reader and a sheet, and an image forming apparatus including the same.

According to one aspect of the present invention, an image reading apparatus includes: a frame; a sheet conveyance unit configured to convey a sheet in a sheet conveyance direction; a facing member configured to face a first surface of the sheet conveyed by the sheet conveyance unit; a reading unit supported movably by the frame in a thickness direction of the sheet conveyed by the sheet conveyance unit, the reading unit including: a transparent portion defining a sheet conveyance path between the facing member and the transparent portion; and a first reading sensor configured to read image information from a second surface opposite to the first surface of the sheet passing through the sheet conveyance path through the transparent portion; an urging member configured to urge the reading unit toward the facing member in the thickness direction; a fixed guide fixed to the frame and disposed in adjacent to the reading unit in the sheet conveyance direction, the fixed guide being configured to guide the second surface of the sheet conveyed by the sheet conveyance unit; a plurality of protruded portions provided on either one of the reading unit and the fixed guide and protruding in the sheet conveyance direction at a plurality of positions in a width direction orthogonal to the sheet conveyance direction; and a plurality of recessed portions provided on the other of the reading unit and the fixed guide and arranged on positions in the width direction corresponding to the plurality of the protruded portions, wherein the reading unit is movable in the thickness direction in a state where the plurality of the protruded portions are overlapped with the plurality of the recessed portions when viewed from the width direction.

According to another aspect of the present invention, an image reading apparatus includes: a frame; a sheet conveyance unit configured to convey a sheet in a sheet conveyance direction; a transparent member configured to face a first surface of the sheet conveyed by the sheet conveyance unit; a movable member including a facing portion defining a sheet conveyance path between the transparent member and the facing portion and configured to face a second surface opposite to the first surface of the sheet passing through the sheet conveyance path, the movable member being supported movably by the frame in a thickness direction of the sheet conveyed by the sheet conveyance unit; a reading sensor configured to read image information from the first surface of the sheet passing through the sheet conveyance path through the transparent member; an urging member configured to urge the movable member toward the transparent member in the thickness direction; a fixed guide fixed to the frame and disposed in adjacent to the movable member in the sheet conveyance direction, the fixed guide being configured to guide the second surface of the sheet conveyed by the sheet conveyance unit; a plurality of protruded portions provided on either one of the movable member and the fixed guide and protruding in the sheet conveyance direction at a plurality of positions in a width direction orthogonal to the sheet conveyance direction; and a plurality of recessed portions provided on the other of the movable member and the fixed guide and arranged on positions in the width direction corresponding to the plurality of the protruded portions, wherein the movable member is movable in the thickness direction in a state where the plurality of the protruded portions are overlapped with the plurality of the recessed portions when viewed from the width direction.

According to still another aspect of the present invention, an image forming apparatus includes: an image forming unit; and an image reading apparatus configured to read image information from a sheet, the image forming unit being configured to form an image on a recording medium based on the image information read by the image reading apparatus. The image reading apparatus includes: a frame; a sheet conveyance unit configured to convey a sheet in a sheet conveyance direction; a facing member configured to face a first surface of the sheet conveyed by the sheet conveyance unit; a reading unit supported movably by the frame in a thickness direction of the sheet conveyed by the sheet conveyance unit, the reading unit including: a transparent portion defining a sheet conveyance path between the facing member and the transparent portion; and a first reading sensor configured to read image information from a second surface opposite to the first surface of the sheet passing through the sheet conveyance path through the transparent portion; an urging member configured to urge the reading unit toward the facing member in the thickness direction; a fixed guide fixed to the frame and disposed in adjacent to the reading unit in the sheet conveyance direction, the fixed guide being configured to guide the second surface of the sheet conveyed by the sheet conveyance unit; a plurality of protruded portions provided on either one of the reading unit and the fixed guide and protruding in the sheet conveyance direction at a plurality of positions in a width direction orthogonal to the sheet conveyance direction; and a plurality of recessed portions provided on the other of the reading unit and the fixed guide and arranged on positions in the width direction corresponding to the plurality of the protruded portions, wherein the reading unit is movable in the thickness direction in a state where the plurality of the protruded portions are overlapped with the plurality of the recessed portions when viewed from the width direction.

Further features of the present invention will become apparent from the following description of exemplary embodiments with reference to the attached drawings.

DESCRIPTION OF THE EMBODIMENTS

Hereinafter, an image reading apparatus and an image forming apparatus according to the present disclosure will be described with reference to the drawings.

Figure 1A:
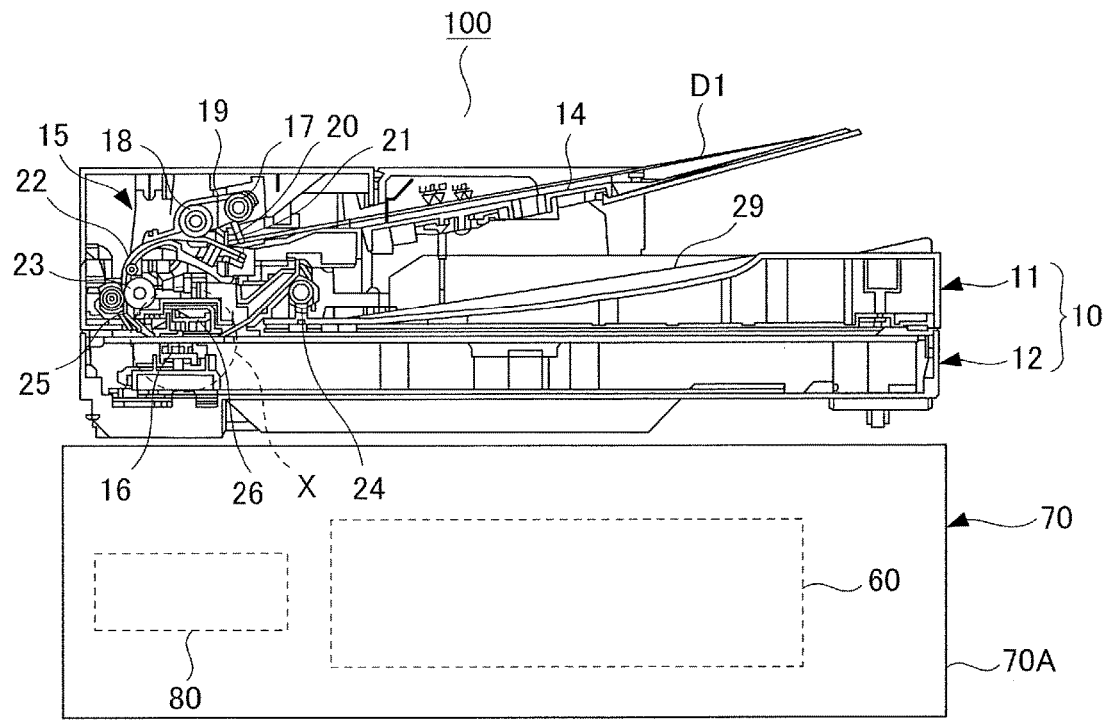
FIG. 1A is a schematic diagram illustrating an image reading portion and an image forming apparatus according to the present disclosure.

First, an outline of a printer 100 as an example of image forming apparatuses will be described. The printer 100 is a laser beam printer of an electrophotographic system. As illustrated in FIG. 1A, the printer 100 includes a printer body 70 and an image reading portion 10 mounted on an upper portion of the printer body 70. Hereinafter, a sheet includes not only plain paper but also special paper such as coated paper, a recording material formed of a special shape such as envelope or index paper, plastic film for overhead projector, cloth, and the like.

Figure 1B:
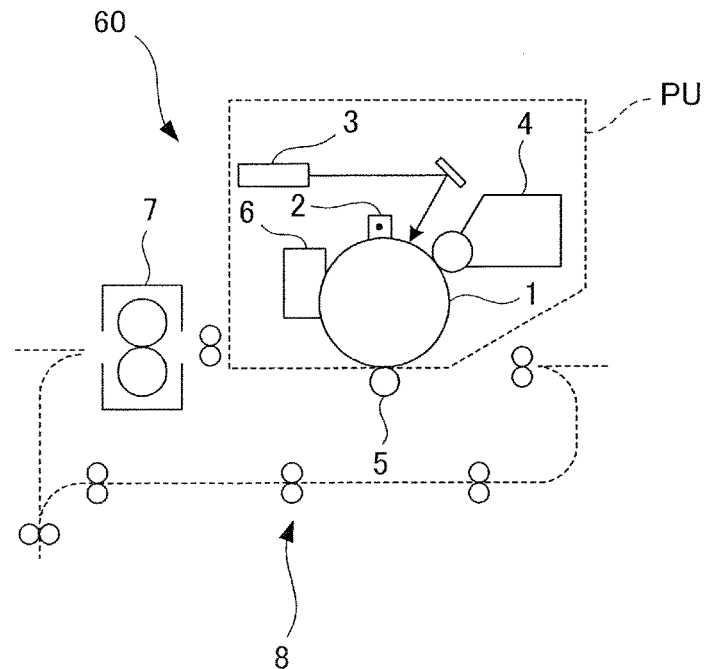
FIG. 1B is a schematic diagram illustrating an image forming engine of the image forming apparatus.

The printer body 70 includes an image forming engine 60 inside a casing 70A. As illustrated in FIG. 1B, the image forming engine 60 includes an image forming unit PU of an electrophotographic system and a fixing unit 7. When the start of an image forming operation is instructed, a photosensitive drum 1, which is a photoconductor, rotates and a drum surface is uniformly charged by a charge device 2. Then, an exposing unit 3 modulates a laser light based on image data transmitted from the image reading portion 10 or an external computer, outputs the laser light and scans the surface of the photosensitive drum 1, so as to form an electrostatic latent image. The electrostatic latent image is visualized, or developed, into a toner image by the toner supplied from a developing unit 4.

Concurrently with such an image forming operation, a feeding operation for feeding a sheet stacked on a cassette (not illustrated) or a manual feed tray toward the image forming engine 60 is performed. The sheet being fed is conveyed in accordance with a progress of the image forming operation by the image forming unit PU. The toner image borne on the photosensitive drum 1 is transferred onto the sheet by a transfer roller 5. The toner remaining on the photosensitive drum 1 after the toner image transfer is collected by a cleaning unit 6. The sheet to which an unfixed toner image is transferred is delivered to the fixing unit 7 and is nipped by a pair of rollers to be heated and pressed. The toner is fused and fixed to the sheet and the sheet to which an image is fixed is discharged to the outside of the casing 70A by a sheet discharge roller pair. In a case in which double-side printing is performed, the sheet passing through the fixing unit 7 is conveyed toward the image forming unit PU again in a state of being reversed by the reversing conveyance unit 8, an image is formed on a back surface, and then is discharged to the outside of the casing 70A.

In addition, a control unit 80 is mounted on the printer body 70. The control unit 80 includes a central processing unit (CPU) that totally controls the printer 100 and a memory that stores a program executed by the CPU, image information, and setting information. The control unit 80 controls the image forming engine 60 to execute the image forming operation for forming an image on a sheet as a recording medium.

It is noted that the image forming engine 60 is an example of an image forming unit capable of forming the image on a sheet as a recording medium. An intermediate transfer system including an intermediate transfer member may be adopted instead of the direct transfer system as described above, or another mechanism such as the ink jet system may be used.

Image Reading Portion

Figure 2:
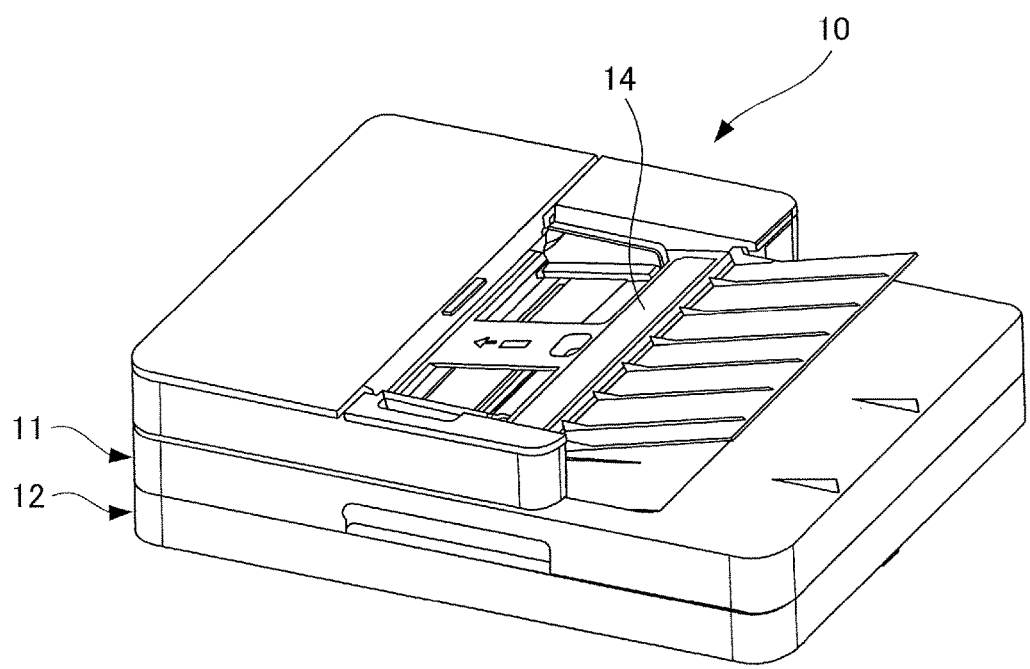
FIG. 2 is a perspective view of the image reading portion according to the present disclosure.

Next, the image reading portion 10, which is an example of an image reading apparatus, will be described. As illustrated in FIG. 2, the image reading portion 10 includes an auto document feeder (ADF) 11 automatically feeding a document, or an original, stacked on a document tray 14 and a scanner unit 12 including a platen glass. The ADF 11, which is an example of a sheet feeding apparatus, is supported pivotably with respect to the scanner unit 12 by a hinge so that the platen glass can be opened. That is, the frame of the image reading portion 10 includes a body frame constituting the scanner unit 12 and an openable frame constituting the ADF 11 and capable of opening and closing with respect to the body frame. Moreover, the sheet used as a document may be a blank document or a sheet of which one or both surfaces include images.

As illustrated in FIG. 1A, the ADF 11 includes the document tray 14 on which a document D1 is placed, a document conveyance unit 15 that conveys the document D1 conveyed from the document tray 14, and a sheet discharge tray 29 discharging the document D1. The document conveyance unit 15 has a document conveyance path 22, or a U-turn path, curved approximately in a U shape. A pickup roller 17, a separating roller 18, a separating pad 19, a document stopper 20, a document presence sensor 21, a conveyance roller pair 23, a sheet discharge roller pair 24, and a document edge sensor 25 are disposed in the document conveyance unit 15 along the document conveyance path 22.

Image readers 16 and 26 each capable of reading image information from the document D1 are disposed respectively in the scanner unit 12 and the ADF 11. As the image readers 16 and 26, contact image sensors are used. That is, in order to read image information, each of the image readers 16 and 26 illuminates an image information surface of the document D1 with light from an LED array as a light source, and reflected light reflected by image information surface is focused on sensor elements through lenses.

Hereinafter, a reading operation (document feeding reading operation) in which the image reading portion 10 reads image information from the document D1 while feeding the document D1 by the ADF 11 will be described. First, an operator stacks the document D1 on the document tray 14. In this case, a leading edge position of the document D1 is positioned by the document stopper 20, the document D1 is detected by the document presence sensor 21, and the control unit 80 recognizes the presence of the document.

When the operator instructs the start of reading via an operation unit (not illustrated), the document stopper 20 is pushed down by a driving force supplied from a driving unit (not illustrated), and the document D1 is conveyed by the pickup roller 17 to a separating portion between the separating roller 18 and the separating pad 19. Then, the document D1 is separated from another document by the separating pad 19, and the uppermost document D1 is conveyed by the separating roller 18. The separated document D1 is conveyed by the conveyance roller pair 23 along the document conveyance path 22 and is conveyed toward reading positions for the image readers 16 and 26.

Then, after the document edge sensor 25 detected the leading edge of the document D1, the image readers 16 and 26 start to read image information at timing when the leading edge of the document D1 has proceeded by a predetermined amount from a detection position of the document edge sensor 25. The image reader 16 disposed in the scanner unit 12 reads image information from a first surface, or a front surface, and the image reader 26 disposed in the ADF 11 reads image information from a second surface, or a back surface, opposite to the first surface of the document D1. The document D1 passing through the reading positions of the image readers 16 and 26 is conveyed toward the sheet discharge roller pair 24. After the document edge sensor 25 detected a trailing edge of the document D1, the image readers 16 and 26 complete reading of image information at timing when the trailing edge of the document D1 has proceeded by a predetermined amount from the detection position of the document edge sensor 25. The document D1 is discharged to the sheet discharge tray 29 by the sheet discharge roller pair 24. Such a reading operation is repeated until the document presence sensor 21 detects that there is no document stacked on the document tray 14.

It is noted that the image reading portion 10 can perform another reading operation (fixed reading operation) for reading image information from the document stacked on the platen glass of the scanner unit 12. In this case, with the document placed on the platen glass, the image reader 16 moves along the platen glass in a sub-scanning direction (rightward and leftward direction in FIG. 1A) so as to read image information from the document.

Detailed Configuration of Reading Portion

Figure 3:
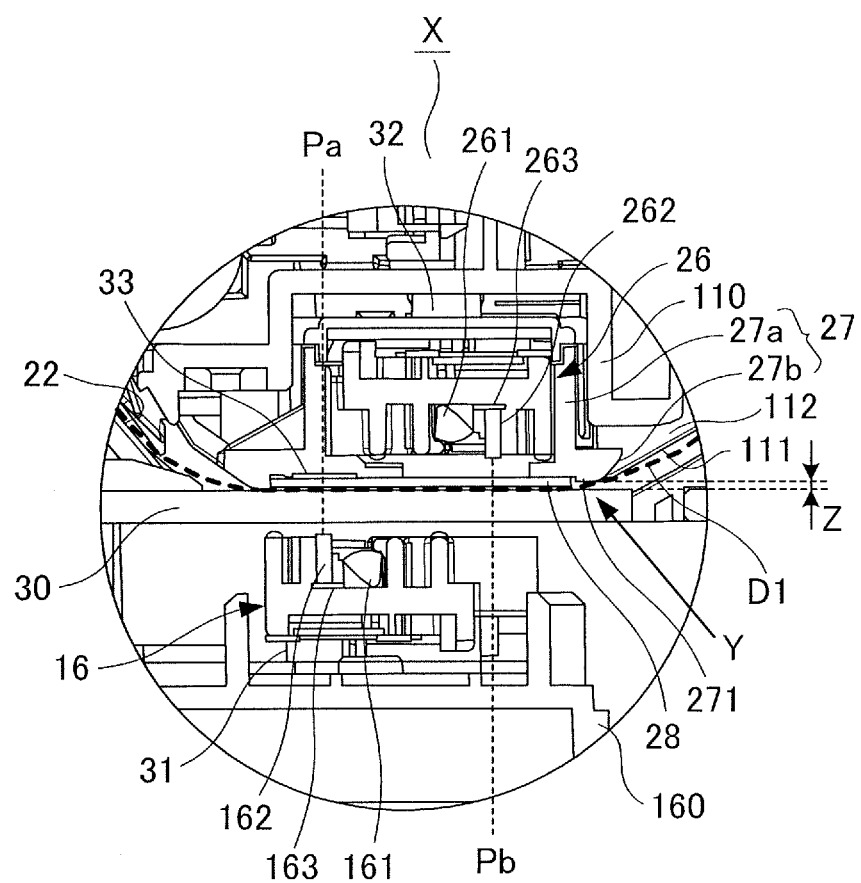
FIG. 3 is an enlarged view illustrating a noticeable portion of the image reading portion according to the present disclosure.

Now, a configuration of the image reading portion by which image information is read by scanning the document when the document feeding reading is performed will be described with reference to FIG. 3. FIG. 3 is an enlarged view of an area indicated by X in FIG. 1A. The image readers 16 and 26 respectively includes light guides 161 and 261, lens arrays 162 and 262, image sensors 163 and 263. Each of the image readers 16 and 26 projects light from the light source toward the document conveyance path 22 through the light guide 161 or 261, and focuses reflected light from the document on the image sensor 163 or 263, and acquires image information through photoelectric conversion.

Hereinafter, the reading position of the first image reader 16 in the document conveyance direction, or an optical axis position of the lens array 162, is referred to as a first reading position Pa. The reading position of the second image reader 26, that is, an optical axis position of the lens array 262, is referred to as a second reading position Pb. The document conveyance direction (i.e., rightward direction in FIG. 3) in the image reading portion is a sheet conveyance direction of a sheet as a document to be read in this embodiment. The document conveyance path 22 is a sheet conveyance path in this embodiment. In addition, a direction (depth direction in FIG. 3) orthogonal to the document conveyance direction is referred to as a width direction of the document, and a direction (up-down direction in FIG. 3) orthogonal to both of the document conveyance direction and the width direction of the document are referred to as a thickness direction of the document.

The first image reader 16 (i.e., a second image sensor in this embodiment) is supported by a carriage 160. The carriage 160 can be moved with respect to the body frame of the scanner unit 12 in the sub-scanning direction, and when the fixed reading operation is performed, moves the image reader 16 through below the platen glass in the sub-scanning direction. A contact glass 30 for covering the image reader 16 in the first reading position Pa is attached to the body frame of the scanner unit 12. In addition, a pressing member 31 such as a spring for urging the image reader 16 toward the contact glass 30 is disposed between the image reader 16 and the carriage 160. In a case of the document feeding reading, the image reader 16 reads image information from the first surface of the document D1 through the contact glass 30, which is a transparent member in this embodiment.

The second image reader 26 (i.e., a first image sensor in this embodiment) is a reading unit held by a holder 27 and is disposed on a side opposite to the first image reader 16 with respect to the document conveyance path 22. The holder 27 includes a housing portion 27a forming a housing space for accommodating the image reader and a framing portion 27b supported by the housing portion 27a. A contact glass 28 as a transparent portion is fitted in the framing portion 27b. The contact glass 28 forms the document conveyance path 22 with the contact glass 30 as a facing member. The holder 27 is supported movably in the thickness direction of the document at the second reading position Pb by a frame 110, that is, the frame of the ADF 11. As an urging member for urging the holder 27 toward the contact glass 30, a pressing member 32 such as a spring is disposed between the holder 27 and the frame 110. When the document feeding reading is performed, the image reader 26 reads image information from the second surface of the document D1 through the contact glass 28.

A white reference plate 33 facing the first image reader 16 in the first reading position Pa is attached to the holder 27. The white reference plate 33 has a high brightness such as white and serves as a background of images read by the image reader 16. That is, the holder 27 is a retaining member for retaining the second image reader 26 and includes the contact glass 28 as the facing portion facing the first image reader 16 and the white reference plate 33. The holder is also an example of a movable member movable with respect to the image reader 16.

By the way, a peripheral speed of the sheet discharge roller pair 24 (see FIG. 1A) in the document feeding reading is set to be greater than that of the conveyance roller pair 23. In other words, the peripheral speed of the first conveyance roller pair disposed upstream of the reading unit is set to be smaller than that of a second conveyance roller pair disposed downstream of the reading unit. Therefore, loosening or wrinkling of the document D1 between the conveyance roller pair 23 and the sheet discharge roller pair 24 is reduced. This arrangement makes it possible to improve stability of the conveyance operation and image quality of the read image. Here, each of the conveyance roller pair 23 and the sheet discharge roller pair 24 is an example of a sheet conveyance unit for conveying a sheet as a document, and another conveying member such as a conveyor belt may be used.

As illustrated in FIG. 3, the guide surface, which is configured of the holder 27 on which the contact glass 28 is mounted and ribs 111 of a fixed guide 112, has a curved shape so as to be convex downward in FIG. 3, such that the first surface of the document D1 will become a projected shape. In other words, the guide surface, which is curved so that the first surface of the document D1 has the projected shape, is disposed between the conveyance roller pair 23 positioned upstream the image reader 26 and the sheet discharge roller pair 24 positioned downstream of the image reader 26 in the document conveyance path 22 (see FIG. 1A). Therefore, as described above, in a case in which the peripheral speed of the sheet discharge roller pair 24 is set to be greater than the peripheral speed of the conveyance roller pair 23, the document D1 will press the holder 27 upward by tension generated in the document D1 between the conveyance roller pair 23 and the sheet discharge roller pair 24.

Here, as illustrated in FIG. 3, the fixed guide 112 fixed to the frame 110 of the ADF 11 is provided at a position adjacent to and downstream of the holder 27 in the document conveyance direction. In this embodiment, the fixed guide 112 regulates the conveyance route of the document D1 against the tension and can regulate that the holder 27 moves away from the contact glass 30 more than necessary.

Figure 4:
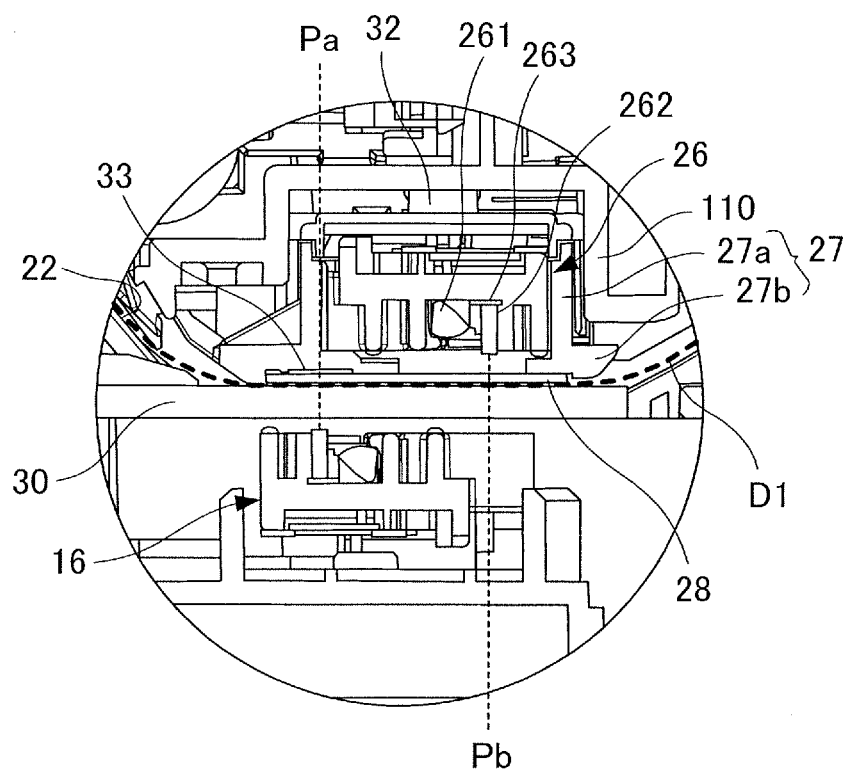
FIG. 4 is an enlarged view illustrating a first alternative configuration.
Figure 5:
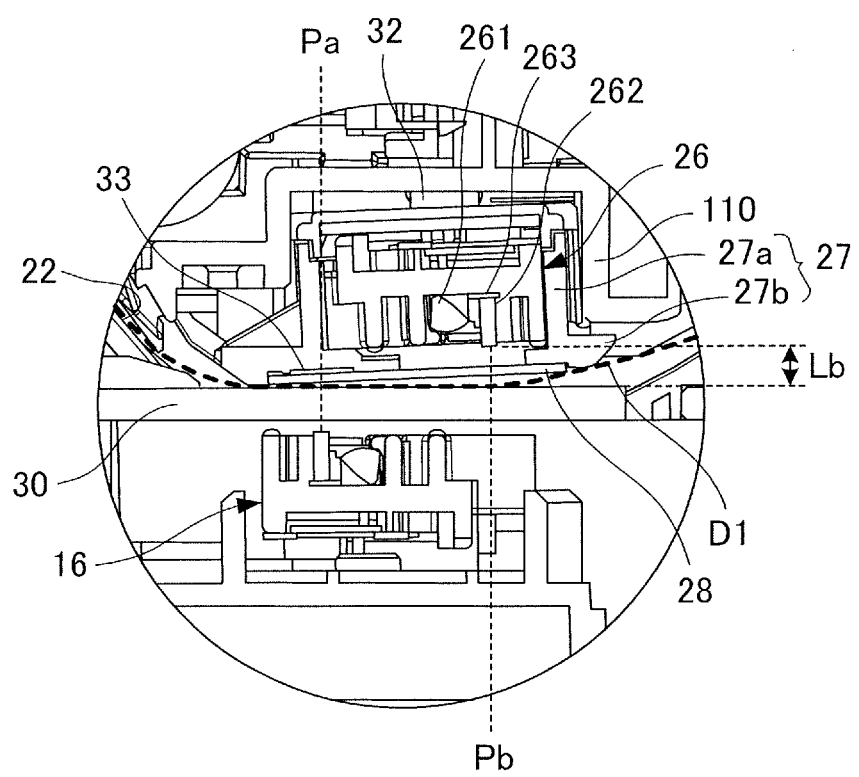
FIG. 5 is an enlarged view for explaining an inclination of a reading unit in the first alternative configuration.

As illustrated in FIG. 4, in a first alternative configuration in which any guide member for guiding the document D1 is not disposed at the same position as the fixed guide 112 in the frame 110, as illustrated in FIG. 5, the holder 27 is lifted by the document D1. In this case, it is conceivable that an interval between the contact glasses 28 and 30 at the second reading position Pb is widened and a distance Lb between the image reader 26 and the document D1 is unstable. As a result, the image quality of the image read by the image reader 26 may be deteriorated. In addition, a posture of the holder 27 may be changed and thereby the distance between the first image reader 16 and the contact glass 28 varies, so that the image quality of the image read by the image reader 16 may be deteriorated.

On the other hand, in the present embodiment, even in a case in which the holder 27 is pressed by the document D1, the holder 27 is regulated not to be moved away from the contact glass 30 exceeding a clearance Z between the fixed guide 112 and the contact glass 30 due to the fixed guide 112. In addition, even in a case in which an external force is applied to the holder 27 due to another cause such as vibration of the apparatus or stiffness of the document in addition to the peripheral speed difference between the sheet discharge roller pair 24 and the conveyance roller pair 23, the holder 27 is regulated not to be greatly separated from the contact glass 30 due to the fixed guide 112. Therefore, it is possible to stabilize the image quality of the image read by the image readers 16 and 26. In addition, since the posture of the holder 27 is stabilized and the interval between the contact glasses 28 and 30 is retained close to constant, it is possible to reduce the possibility of document jam.

Figure 6:
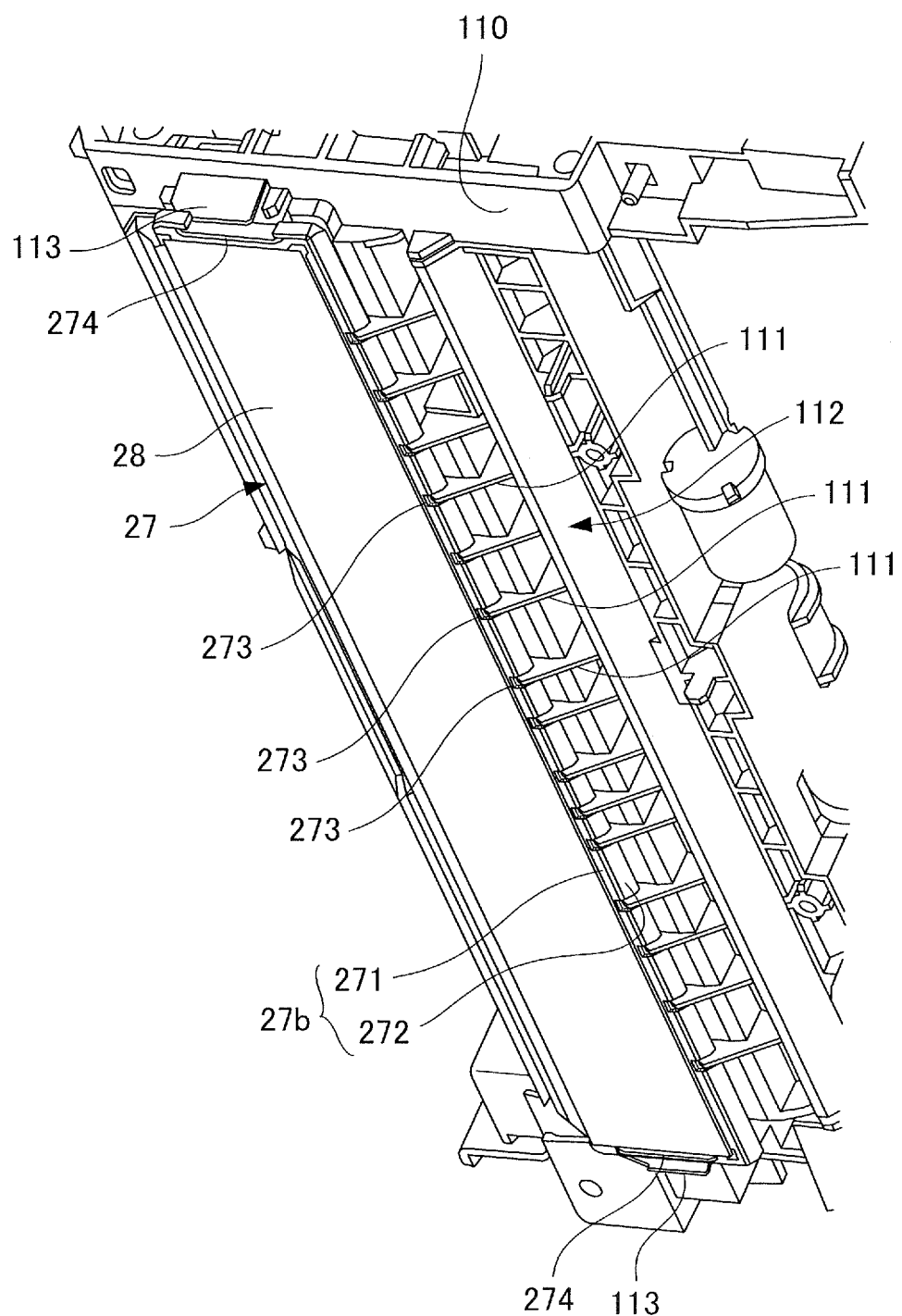
FIG. 6 is a perspective view of an inside of the image reading portion according to the present disclosure viewed from an arrow Y direction illustrated in FIG. 3.

As illustrated in FIG. 6, the fixed guide 112 includes a plurality of the ribs 111 each extending along the document conveyance direction. The ribs 111 are overlapped with recessed portions 273 disposed in the framing portion 27b of the holder 27 when viewed from the width direction. That is, the holder 27 is movable in the thickness direction of the document in a state in which the recessed portions 273 as a plurality of recessed portions in this embodiment are loosely engaged with the ribs 111 as a plurality of protruded portions in this embodiment. The rib 111 is a first uneven portion disposed in the fixed guide and the recessed portion 273 is a second uneven portion which is disposed in the retaining member and which can mesh with the first uneven portion.

The framing portion 27b includes a flat portion 271, which faces the contact glass 30 and extends substantially parallel to the contact glass 30 when viewed from the width direction, and an inclined portion 272 inclined in a direction that the inclined portion 272 is positioned further away from the contact glass 30 as the inclined portion 272 extends further downstream in the document conveyance direction from the flat portion 271. The flat portion 271 and the inclined portion 272 constitute a guide surface for guiding the second surface of the document. The recessed portion 273 is formed as a recessed shape across the flat portion 271 and the inclined portion 272. In addition, each rib 111 extends along the inclination direction of the inclined portion 272 and is disposed so as to be positioned within one of the recessed portions 273.

Figure 7:
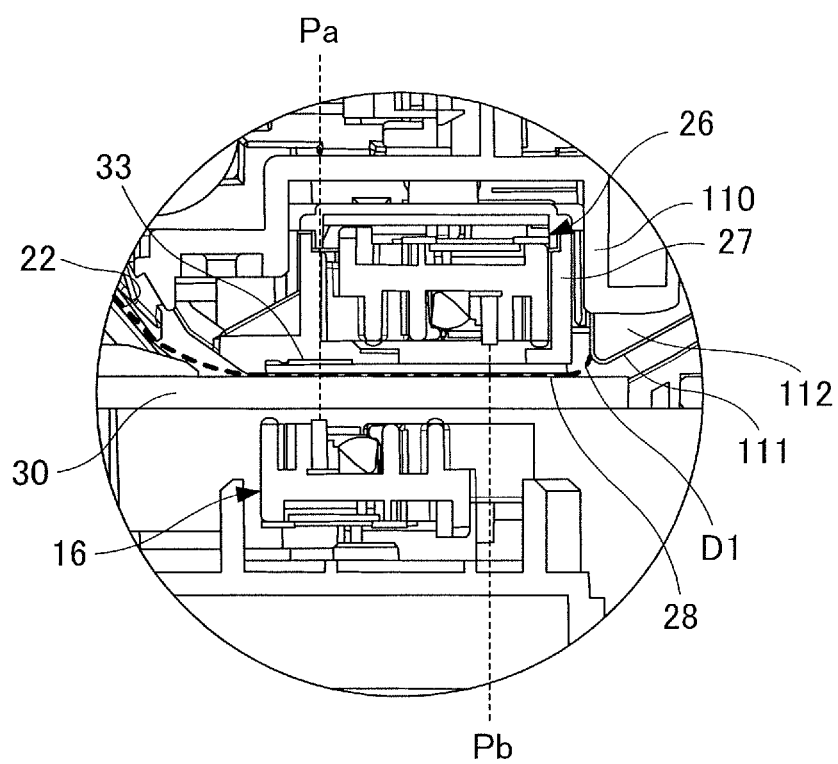
FIG. 7 is an enlarged view illustrating a second alternative configuration.

As illustrated in FIG. 7, in a second alternative configuration in which uneven shapes engaging with each other are not disposed in the holder 27 and the fixed guide 112, and the document is directly passed from the contact glass 28 to the fixed guide 112, document jam may occur. That is, in this configuration, in a case in which the leading edge of the document D1 (i.e., the downstream edge in the document conveyance direction) is curled upward in FIG. 7, it is conceivable that the leading edge of the document D1 goes into the gap between the holder 27 and the fixed guide 112. While FIG. 7 illustrates an example in which a part of the framing portion of the holder 27 is removed as compared to the present embodiment, if the framing portion without the recessed portion is provided so as to be in contact with the fixed guide 112, it may fail to prevent document jam. That is, in a configuration in which a boundary between the holder 27 and the fixed guide 112 extends linearly in the width direction, the leading edge of the document D1 may be caught in a minute step or a gap of the boundary.

On the other hand, according to the present embodiment, the plurality of the ribs 111 disposed in the fixed guide 112 are respectively disposed so as to enter the recessed portion 273 of the holder 27. Therefore, the leading edge of the document D1 is prevented from being caught by the boundary between the holder 27 and the fixed guide 112 and thereby the document is smoothly passed from the holder 27 to the fixed guide 112. That is, in a configuration in which the holder 27 as a retaining member for retaining the second image reader 26 is movable with respect to the frame 110, it is possible to also improve stability of the document conveyance. In the same time, in a configuration in which the contact glass 28 as a facing portion facing the first image reader 16 is movable with respect to the frame 110, it is possible to improve stability of the document conveyance.

Although the first uneven portion in the present embodiment is a comb-like member (i.e., a plurality of protruded portions) configured by the ribs 111 that are rib-like members and the second uneven portion in the present embodiment is configured by the recessed portions 273 (i.e., a plurality of recessed portions) having a recessed shape loosely fit therewith, as described above, the shape of the first uneven portion and the second uneven portion may be changed. For example, the rib-like member (a plurality of protruded portions) may be disposed on the holder 27 and a plurality of recessed portions into which the rib-like member is fit may be disposed in the fixed guide 112. In addition, the boundary between the holder 27 and the fixed guide 112 may be formed in a sawtooth shape or a rectangular wave shape. In other words, any modification can be adopted as long as the first uneven portion includes unevenness in the sheet conveyance direction formed at a plurality of positions in the width direction and the second uneven portion is formed so as to engage therewith.

As illustrated in FIG. 6, first projecting portions 274 and 274 are disposed on both end portions of the holder 27 in the width direction, and second projecting portions 113 and 113 are disposed on the outside of the first projecting portions 274 and 274 in the frame 110 of the ADF 11. Each of the projecting portions 113 and 274 is disposed so as to be in contact with the contact glass 30 in a state in which the ADF 11 is closed. The first projecting portion 274 as a first contact portion comes into contact with the contact glass 30 when the ADF 11 is closed, so as to define the interval between the two contact glasses 28 and 30. In addition, the second projecting portion 113 as a second contact portion comes into contact with the contact glass 30 when the ADF 11 is closed, so as to define the clearance Z (see FIG. 3) between the rib 111 and the contact glass 30. These features enable to position each of the holder 27 and the fixed guide 112 properly with respect to the contact glass 30 in the configuration where the holder 27 is movable with respect to the fixed guide 112.

Other Embodiments

The image reading portion 10 in the above-described embodiment includes the two image readers 16 and 26 facing each other with the document conveyance path 22 interposed therebetween, but the present technique may be applied to a configuration in which two reading sensors are disposed at different positions in the document conveyance direction. In addition, the technique may be applied to an image reading apparatus which includes just one reading sensor and is capable of reading image information from one surface of the document. That is, the contact glass 30 is merely an example of a facing member facing a movable retaining member, and it is not limited to such a transparent member used for another reading sensor (e.g., the image reader 16 in the above described embodiment). In addition, the holder 27 is merely an example of a movable member including a facing portion (e.g., the contact glass 28) facing the transparent member, and it is not limited to a retaining member for retaining another reading sensor (e.g., the image reader 26).

In these modifications, if such a configuration is adopted that a retaining member for retaining a first reading sensor (e.g., the image reader 26) is movable with respect to a frame, a first uneven portion is disposed on a fixed guide adjacent to the retaining member and a second uneven portion loosely engaging with the first uneven portion is disposed on the retaining member. Meanwhile, if such a configuration is adopted that a movable member having a facing portion facing a second reading sensor (e.g., the image reader 16) is movable with respect to a frame, a first uneven portion is disposed on a fixed guide adjacent to the movable member and a second uneven portion loosely engaging with the first uneven portion is disposed on the movable member. With either or both of these arrangements, it is possible to reduce the possibility that the document is caught in the boundary between the fixed guide and the retaining member or in the boundary between the fixed guide and the movable member while stabilizing the distance between the reading sensor(s) and the document by the fixed guide.

In addition, in the present embodiment, the first uneven portion (i.e., the ribs 111) and the second uneven portion (i.e., the recessed portions 273) are disposed downstream of the image sensor (i.e., the image reader 26) in the document conveyance direction, but a first uneven portion and a second uneven portion may be disposed upstream of an image sensor. Moreover, the image reading portion 10 is just an example of image reading apparatuses, and it may be an apparatus used independently from the image forming apparatus with printing function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-014634, filed on Jan. 30, 2017, which is hereby incorporated by reference wherein in its entirety.

What is claimed is:

1. An image reading apparatus comprising:
a frame;
a sheet conveyance unit configured to convey a sheet in a sheet conveyance direction;
a facing member configured to face a first surface of the sheet conveyed by the sheet conveyance unit;
a reading unit supported movably by the frame in a thickness direction of the sheet conveyed by the sheet conveyance unit, the reading unit comprising:
  a transparent portion defining a sheet conveyance path between the facing member and the transparent portion; and
  a first reading sensor configured to read image information from a second surface opposite to the first surface of the sheet passing through the sheet conveyance path through the transparent portion;
an urging member configured to urge the reading unit toward the facing member in the thickness direction;
a fixed guide fixed to the frame and disposed in adjacent to the reading unit in the sheet conveyance direction, the fixed guide being configured to guide the second surface of the sheet conveyed by the sheet conveyance unit;
a plurality of protruded portions provided on either one of the reading unit and the fixed guide and protruding in the sheet conveyance direction at a plurality of positions in a width direction orthogonal to the sheet conveyance direction; and
a plurality of recessed portions provided on the other of the reading unit and the fixed guide and arranged on positions in the width direction corresponding to the plurality of the protruded portions, wherein the reading unit is movable in the thickness direction in a state where the plurality of the protruded portions are overlapped with the plurality of the recessed portions when viewed from the width direction.

2. The image reading apparatus according to claim 1, further comprising a second reading sensor,
wherein the facing member is a transparent member allowing light to pass through, and
wherein the second reading sensor is disposed on a side opposite to the first reading sensor with respect to the facing member and configured to read image information from the first surface of the sheet passing through the sheet conveyance path through the facing member.

3. The image reading apparatus according to claim 1, wherein the frame comprises
a body frame supporting the facing member, and
an openable frame supporting the reading unit and the fixed guide and configured to be opened and closed with respect to the body frame, and
wherein the openable frame is provided with a first contact portion configured to be in contact with the facing member in a state where the openable frame is closed, such that the openable frame is positioned with respect to the facing member in the thickness direction.

4. The image reading apparatus according to claim 1, wherein the frame comprises
a body frame supporting the facing member, and
an openable frame supporting the reading unit and the fixed guide and configured to be opened and closed with respect to the body frame, and
wherein the reading unit is provided with a second contact portion configured to be in contact with the facing member in a state where the openable frame is closed, such that the transparent portion is positioned with respect to the facing member in the thickness direction.

5. The image reading apparatus according to claim 1, wherein each of the plurality of the protruded portions is a rib extending in the sheet conveyance direction, and
wherein each of the plurality of the recessed portions is a recessed shape into which the rib is fitted.

6. The image reading apparatus according to claim 1, wherein the reading unit comprises a retaining member retaining the first reading sensor and supported movably by the frame,
wherein the plurality of the recessed portions are disposed on the retaining member, and
wherein the plurality of the protruded portions are disposed on the fixed guide.

7. The image reading apparatus according to claim 6, wherein the retaining member comprising a housing portion housing the first reading sensor and a framing portion which is supported by the housing portion and in which the transparent portion is fitted, and
wherein the plurality of the recessed portions are formed in the framing portion.

8. The image reading apparatus according to claim 7, wherein the fixed guide is disposed downstream of the reading unit in the sheet conveyance direction,
wherein the framing portion comprises
a flat portion extending substantially parallel to the facing member when viewed from the width direction, and
an inclined portion extending from the flat portion and inclined such that the inclined portion is positioned further away from the facing member as extending further downstream in the sheet conveyance direction, and
wherein the plurality of the protruded portions extend in a direction along the inclined portion when viewed from the width direction.

9. The image reading apparatus according to claim 1,
wherein the sheet conveyance unit comprises a first conveyance roller pair and a second conveyance roller pair respectively disposed upstream of and downstream of the reading unit in the sheet conveyance direction,
wherein the reading unit and the fixed guide are configured to form a guide surface curved so that the sheet is conveyed through the sheet conveyance path with the first surface thereof protruded between the first conveyance roller pair and the second conveyance roller pair, and
wherein a peripheral speed of the second conveyance roller pair is greater than a peripheral speed of the first conveyance roller pair in a case of conveying the sheet through the sheet conveyance path.

10. An image reading apparatus comprising:
a frame;
a sheet conveyance unit configured to convey a sheet in a sheet conveyance direction;
a transparent member configured to face a first surface of the sheet conveyed by the sheet conveyance unit;
a movable member comprising a facing portion defining a sheet conveyance path between the transparent member and the facing portion and configured to face a second surface opposite to the first surface of the sheet passing through the sheet conveyance path, the movable member being supported movably by the frame in a thickness direction of the sheet conveyed by the sheet conveyance unit;
a reading sensor configured to read image information from the first surface of the sheet passing through the sheet conveyance path through the transparent member;
an urging member configured to urge the movable member toward the transparent member in the thickness direction;
a fixed guide fixed to the frame and disposed in adjacent to the movable member in the sheet conveyance direction, the fixed guide being configured to guide the second surface of the sheet conveyed by the sheet conveyance unit;
a plurality of protruded portions provided on either one of the movable member and the fixed guide and protruding in the sheet conveyance direction at a plurality of positions in a width direction orthogonal to the sheet conveyance direction; and
a plurality of recessed portions provided on the other of the movable member and the fixed guide and arranged on positions in the width direction corresponding to the plurality of the protruded portions, wherein the movable member is movable in the thickness direction in a state where the plurality of the protruded portions are overlapped with the plurality of the recessed portions when viewed from the width direction.

11. An image forming apparatus comprising:
an image forming unit; and
an image reading apparatus configured to read image information from a sheet, the image forming unit being configured to form an image on a recording medium based on the image information read by the image reading apparatus, the image reading apparatus comprising:
a frame;
a sheet conveyance unit configured to convey a sheet in a sheet conveyance direction;
a facing member configured to face a first surface of the sheet conveyed by the sheet conveyance unit;
a reading unit supported movably by the frame in a thickness direction of the sheet conveyed by the sheet conveyance unit, the reading unit comprising:
 a transparent portion defining a sheet conveyance path between the facing member and the transparent portion; and
 a first reading sensor configured to read image information from a second surface opposite to the first surface of the sheet passing through the sheet conveyance path through the transparent portion;
an urging member configured to urge the reading unit toward the facing member in the thickness direction;
a fixed guide fixed to the frame and disposed in adjacent to the reading unit in the sheet conveyance direction, the fixed guide being configured to guide the second surface of the sheet conveyed by the sheet conveyance unit;
a plurality of protruded portions provided on either one of the reading unit and the fixed guide and protruding in the sheet conveyance direction at a plurality of positions in a width direction orthogonal to the sheet conveyance direction; and
a plurality of recessed portions provided on the other of the reading unit and the fixed guide and arranged on positions in the width direction corresponding to the plurality of the protruded portions, wherein the reading unit is movable in the thickness direction in a state where the plurality of the protruded portions are overlapped with the plurality of the recessed portions when viewed from the width direction.

* * * * *